UNITED STATES PATENT OFFICE.

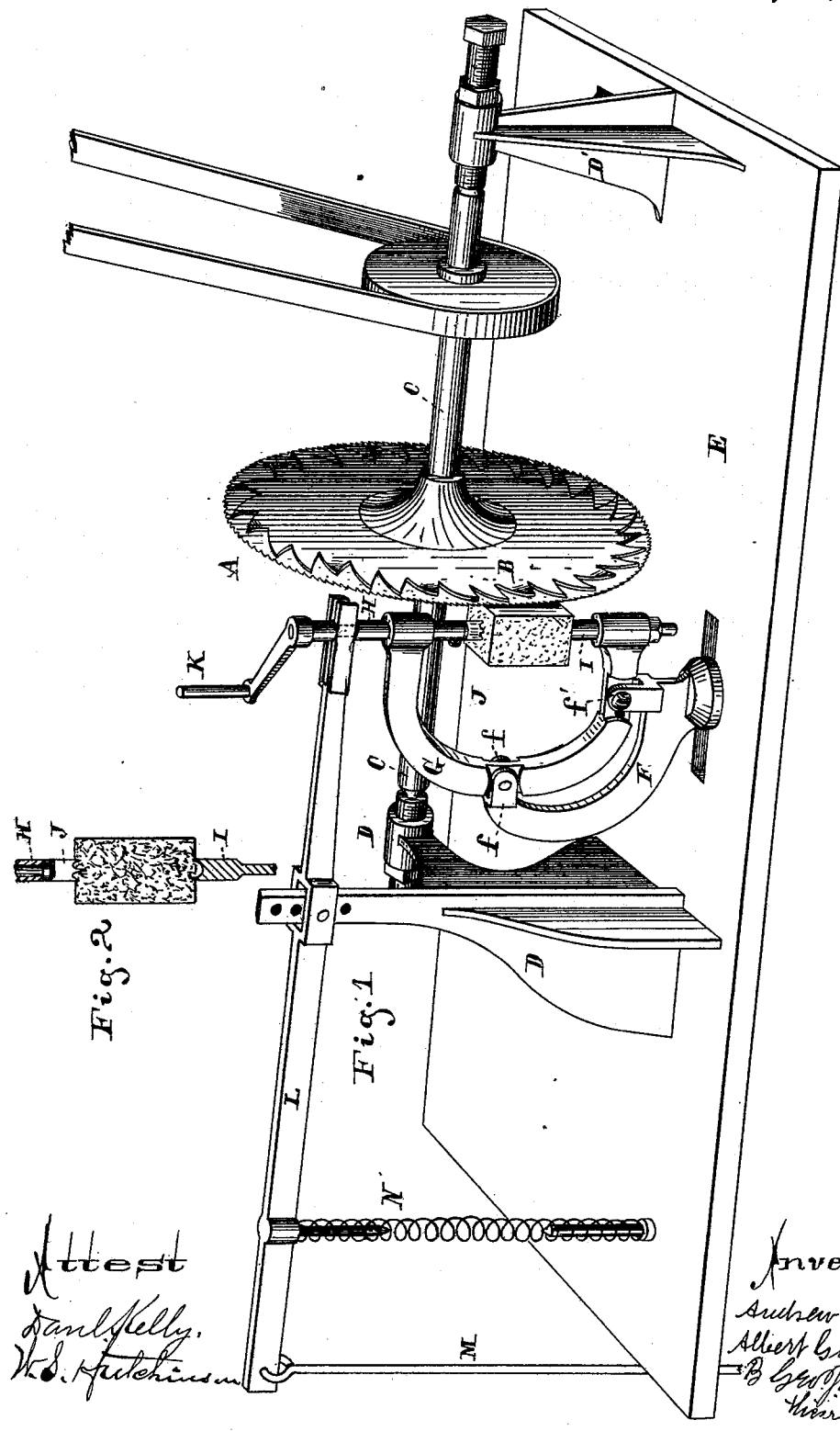

ANDREW GOETZINGER AND ALBERT GOETZINGER, OF CINCINNATI, OHIO; SAID ANDREW GOETZINGER ASSIGNOR TO SAID ALBERT GOETZINGER.

CORK-CUTTING MACHINE.

SPECIFICATION forming part of Letters Patent No. 229,818, dated July 13, 1880.

Application filed March 27, 1880. (No model.)

*To all whom it may concern:*

Be it known that we, ANDREW GOETZINGER and ALBERT GOETZINGER, of the city of Cincinnati, county of Hamilton, State of Ohio, have invented a new and useful Improvement in Cork-Cutting Machines, of which the following is a specification.

The objects of our invention are, first, to produce an even polished surface upon the corks; second, to provide a convenient means of holding and feeding the corks to the cutting-tool; third, to provide for the adjustment of the feeding device with relation to the cutting-tool, so as to cut the corks cylindrical, or of any desired taper; fourth, a means to readily grasp the corks, rotate them to the cutting-tool, and release them when dressed; and, fifth, to provide means to trim corks of different sizes and shapes upon the same machine. These objects are attained by the mechanism illustrated in the accompanying drawings, in which—

Figure 1 is a perspective view of a machine embodying our improvements, and Fig. 2 is an axial section of the centering-spindles with a cork-blank in position between them.

The cutting-tool is composed of two saws, A and B, which are clamped tightly together by flanges upon a mandrel, C. The mandrel is mounted between stocks D D', which are secured upon a bed-plate, E. The cutting-saw A is a thin blade with small teeth, which are sharpened to a cutting-edge without "set." B is a heavy blade with coarse teeth, which set slightly back of the teeth in blade A. Every third tooth in saw B is set out from the side of saw A. The purpose of saw B is to clear away the loose part of the cork separated by blade A, which cuts in advance of it, to permit the blank to turn freely while being trimmed to the proper size and shape.

F is a standard resting upon the bed-plate E. It has a screw-threaded shank, which passes through a longitudinal slot in the plate, to permit it to be adjusted nearer to or farther from the cutting-tool, and secured firmly in place when so adjusted by a nut on the under side. In this standard is mounted a frame, G. The opposite ends of the frame have bearings to receive the centering-spindles H and I, which are axially opposite each other. The frame is hung upon a pin between the lugs $f$ $f$ of the standard F, and is steadied in position by similar lugs $f'$ $f'$, which project up from the foot of the standard. The lower arm of the frame G is slotted. A set-screw passes through the outer lug, $f'$, and the slot in the frame into a nut which is let into an angular opening in the opposite lug $f'$, and presses the side of the frame when the set-screw is tightened to hold the centering-spindles perpendicular or at any desired angle to the path of the cutting-tool.

The spindles H and I are fitted to revolve freely in the ends of frame G. The upper spindle, H, is also adapted to slide vertically to grasp and release the cork. The lower spindle, I, has a nut or collar at its lower end to prevent it from being withdrawn when the finished cork is removed. The spindle H has its lower end bored to receive the centering-bit J, which is held in place by a set-screw. The bit J and the spindle I being removable admits of different-sized centers being used, and adapts the machine to cut the various sizes of corks required. The spindle H is provided with a crank, K, by which the cork-blank is rotated to the cutting-tool.

L is a lever fulcrumed upon a projection extending up from stock D. Its forward end is bifurcated to receive the spindle H, which is suspended in the end of the lever by the forked ends entering the annular groove turned in the upper part of the spindle. At the opposite end of the lever is a rod or pitman, M, which is connected to a treadle (not shown in the drawings) in a position to be actuated by the foot of the operator to elevate the spindle H and release the cork when finished.

A coiled spring, N, which is compressed between the bed-plate and the under side of the lever, and held in place by steady-pins, which are secured respectively in the bed-plate and the lever, presses the cork firmly between the centering-points.

The center bearings, in which the mandrel C is mounted, are screw-threaded and tapped into their bosses in standards D D', and held firmly in position by jam-nuts on their outer ends.

The operation is as follows: The blank-holding devices being adjusted the proper distance from the path of the cutting-tool to form a cork of the desired size, the frame G adjusted with its centering-spindles at the proper angle to form the required taper, and the proper size of lower spindle and centering-bit (of which there are several sets to each machine) inserted, the mandrel C is made to revolve at a high speed. The operator, by pressing down the treadle, elevates the spindle H. A cork-blank is placed upon spindle I and the treadle released. The spring N forces the points of centering-bit J into the top of the blank and holds it firmly between the centers. Now, by rotating the crank K, the blank is turned against the cutting-edge of blade A, which trims the cork to the proper size, while the blade B clears away the waste cork and permits the blank to be freely turned.

The points of the teeth in blade A are sharpened by holding a stone against the side of the teeth opposite blade B while the cutter is revolving.

We claim—

1. In a cork-cutting machine, the combination, substantially as before set forth, of the cork centering and turning devices and the cutting-tool composed of a cutting-blade and a clearing-blade arranged in close contact with each other.

2. The combination, substantially as before set forth, of the fixed cutting-tool, the horizontally-adjustable standard F, the frame G, mounted on said standard, the sliding crank-spindle H, and revolving step I, mounted in said frame.

3. The combination, substantially as before set forth, of the cutting-tool, the standard F, the centering-frame G, and spindles H and I, the frame G being hung in standard F between lugs $f$ and $f'$, and adjustable to bring the axis of its centering-spindles at any desired angle to the cutting-tool.

4. In a cork-cutting machine of the character described, the combination of rotating spindle I, rotating and sliding spindle H, lever M, connected to the sliding spindle, and the treadle and spring adapted to elevate and lower the spindle for the purpose of grasping and releasing the cork-blank, substantially as specified.

5. In a cork-cutting machine, the cutting-tool A B, the horizontally-adjustable standard F, and independently-adjustable spindle-carrying frame G, in combination with the rotating spindle I, the rotating and sliding spindle H, and the lever, spring, and treadle for elevating or depressing the sliding spindle, substantially as hereinbefore set forth.

ANDREW GOETZINGER.
ALBERT GOETZINGER.

Witnesses:
　DANL. KELLY,
　GEO. J. MURRAY.